(12) United States Patent
Matsuyama

(10) Patent No.: US 7,877,533 B2
(45) Date of Patent: Jan. 25, 2011

(54) BUS SYSTEM, BUS SLAVE AND BUS CONTROL METHOD

(75) Inventor: Hideki Matsuyama, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 133 days.

(21) Appl. No.: 11/806,782

(22) Filed: Jun. 4, 2007

(65) Prior Publication Data
US 2007/0288675 A1 Dec. 13, 2007

(30) Foreign Application Priority Data
Jun. 7, 2006 (JP) .............................. 2006-158988

(51) Int. Cl.
*G06F 13/14* (2006.01)
*G06F 12/02* (2006.01)
*G06F 9/00* (2006.01)

(52) U.S. Cl. ...................... 710/110; 710/200; 712/225
(58) Field of Classification Search ................ 710/110, 710/200; 712/225, 119; 711/140, 169
See application file for complete search history.

(56) References Cited
U.S. PATENT DOCUMENTS

| | | | | |
|---|---|---|---|---|
| 5,455,924 A | * | 10/1995 | Shenoy et al. ............... | 711/118 |
| 5,799,207 A | * | 8/1998 | Wang et al. .................... | 710/38 |
| 5,835,766 A | * | 11/1998 | Iba et al. ...................... | 718/104 |
| 6,449,690 B1 | * | 9/2002 | Pong et al. ................... | 711/118 |
| 6,519,613 B1 | * | 2/2003 | Friske et al. ................. | 707/202 |
| 6,973,521 B1 | * | 12/2005 | Indiresan et al. ............ | 710/200 |
| 7,155,718 B1 | * | 12/2006 | Joffe .......................... | 718/102 |
| 7,240,167 B2 | * | 7/2007 | Shirogane et al. ........... | 711/148 |
| 7,366,801 B2 | * | 4/2008 | Mathrubutham et al. ...... | 710/52 |
| 2008/0005741 A1 | * | 1/2008 | Terrell ......................... | 718/102 |

FOREIGN PATENT DOCUMENTS

JP 04-372018 12/1992

* cited by examiner

*Primary Examiner*—Paul R Myers
*Assistant Examiner*—Trisha Vu
(74) *Attorney, Agent, or Firm*—McGinn IP Law Group, PLLC

(57) ABSTRACT

A bus system includes one or more bus masters, one or more bus slaves, and a response unit. When an access request to a resource of a bus slave is sent from a bus master, the response unit outputs a wait response that is either a blocking wait response to cause the bus master to perform a blocking wait operation or a non-blocking wait response to cause it to perform a non-blocking wait operation to the bus master if the bus slave is in the wait state.

19 Claims, 9 Drawing Sheets

| | INSTRUCTION | CYCLE | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| A | INSTRUCTION 1 | IF | ID | EX | DF | DF | DF | CM | WB | | | | | |
| | INSTRUCTION 2 | | IF | ID | EX | DF | CM | WB | | | | | | |
| | INSTRUCTION 3 | | | IF | ID | EX | DF | CM | WB | | | | | |
| | INSTRUCTION 4 | | | | IF | ID | EX | DF | DF | DF | CM | WB | | |
| | INSTRUCTION 5 | | | | | IF | ID | EX | EX | EX | DF | CM | WB | |

| | ACCESS REQUEST | | | | | | | | | | | | | |
|---|---|---|---|---|---|---|---|---|---|---|---|---|---|---|
| B | REQ | | | ⟋‾⟍ | | | ⟋‾⟍ | | | | | | | |
| | ADS | | | A0 | | | A1 | | | | | | | |
| | CMD | | | C0 | | | C1 | | | | | | | |

| | DATA RETRIEVAL | | | | | | | | | | | | | |
|---|---|---|---|---|---|---|---|---|---|---|---|---|---|---|
| C | R_DAT | | | | | | | D0 | | D1 | | | | |

| | RESPONSE FROM BUS SLAVE | | | | | | | | | | | | | |
|---|---|---|---|---|---|---|---|---|---|---|---|---|---|---|
| D | RESP | | | | | NBW | NBW | RDY | BLW | BLW | RDY | | | |

NBW: NON-BLOCKING WAIT RESPONSE
BLW: BLOCKING WAIT RESPONSE

Fig. 5

RELATED ART

| | INSTRUCTION | CYCLE | | | | | | | | | | |
|---|---|---|---|---|---|---|---|---|---|---|---|---|
| | | 1 | 2 | 3 | 4 | 5 | 6 | 7 | 8 | 9 | 10 | 11 |
| A | INSTRUCTION 1 | IF | ID | EX | DF | DF | DF | CM | WB | | | |
| | INSTRUCTION 2 | | IF | ID | EX | DF | CM | WB | | | | |
| | INSTRUCTION 3 | | | IF | ID | EX | DF | CM | WB | | | |
| | INSTRUCTION 4 | | | | IF | ID | EX | DF | DF | DF | CM | NO WB |
| | INSTRUCTION 5 | | | | | IF | ID | EX | DF | CM | WB | |

| | ACCESS REQUEST | | | | | | | | | | | |
|---|---|---|---|---|---|---|---|---|---|---|---|---|
| B | REQ | | | | | | | | | | | |
| | ADS | | | | A0 | | A1 | | | | | |
| | CMD | | | | C0 | | C1 | | | | | |

| | DATA RETRIEVAL | | | | | | | | | | | |
|---|---|---|---|---|---|---|---|---|---|---|---|---|
| C | R_DAT | | | | | | | D0 | | D1 | | |

| | RESPONSE FROM BUS SLAVE | | | | | | | | | | | |
|---|---|---|---|---|---|---|---|---|---|---|---|---|
| D | RESP | | | | WAIT | WAIT | RDY | WAIT | WAIT | EXP | | |

INSTRUCTION 1 AND INSTRUCTION 4: NON-BLOCKING OPERATION

Fig. 7

RELATED ART

| | INSTRUCTION | CYCLE | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| A | INSTRUCTION 1 | IF | ID | EX | DF | DF | DF | CM | WB | | | | | |
| | INSTRUCTION 2 | | IF | ID | EX | EX | EX | DF | CM | WB | | | | |
| | INSTRUCTION 3 | | | IF | ID | ID | ID | EX | DF | CM | WB | | | |
| | INSTRUCTION 4 | | | | | IF | IF | ID | EX | DF | DF | DF | CM | NO WB |
| | INSTRUCTION 5 | | | | | | | IF | ID | EX | EX | EX | DF | NO CM |

| | ACCESS REQUEST | | | | | | | | | | | | | |
|---|---|---|---|---|---|---|---|---|---|---|---|---|---|---|
| B | REQ | | | ⎽⎽ | | | | | ⎽⎽ | | | | | |
| | ADS | | | A0 | | | | | A1 | | | | | |
| | CMD | | | C0 | | | | | C1 | | | | | |

| | DATA RETRIEVAL | | | | | | | | | | | | | |
|---|---|---|---|---|---|---|---|---|---|---|---|---|---|---|
| C | R_DAT | | | | | | | D0 | | | D1 | | | |

| | RESPONSE FROM BUS SLAVE | | | | | | | | | | | | | |
|---|---|---|---|---|---|---|---|---|---|---|---|---|---|---|
| D | RESP | | | | WAIT | WAIT | RDY | | | WAIT | WAIT | EXP | | |

INSTRUCTION 1 AND INSTRUCTION 4: BLOCKING OPERATION

Fig. 8

BUS SYSTEM, BUS SLAVE AND BUS CONTROL METHOD

BACKGROUND OF THE INVENTION

1. Field of the Invention

The present invention relates to a bus system and, particularly, to a technique of controlling a wait operation of a bus master.

2. Description of Related Art

Various methods for improving the performance of computers have been introduced. Pipelining is used as a technique to improve the performance by executing a plurality of instruction processing in parallel. Specifically, one instruction processing is broken into two or more stages so that each stage of a plurality of instructions can be processed in parallel.

In a bus system using the pipeline, an access from a bus master such as a processor and a DMAC (Direct Memory Access Controller) to a resource of a bus slave is also composed of a plurality of stages. FIG. 6 shows an example of the stages of processing that a bus master performs reading (loading) from a register of a bus slave. A bus master is described as a CPU by way of illustration.

As shown in the example of FIG. 6, the processing that a CPU executes the instruction of loading data from a bus slave is composed of six stages: IF, ID, EX, DF, CM and WB. These stages are: a stage to fetch an instruction into a CPU, a stage to decode the instruction, a stage to execute the instruction (in this example, to send a data loading request as an access request to a bus slave), a stage to obtain an operation result (in this example, to receive a response from a bus slave), a stage to complete the execution, and a stage to write back or to update a resource such as a register of the CPU, respectively.

A bus slave is not always able to perform the processing in response to an access request from a bus master. Thus, in the DF stage to obtain a response from a bus slave, the CPU can receive a ready response indicating that a bus slave is ready to process a request or a wait response indicating that it is not ready. If the CPU receives the wait response, it suspends the execution of an instruction until the stage of the bus slave becomes ready.

In addition to the above two responses, a bus slave can send a response indicating the occurrence of an exception. If the exception is detected in the CM stage to complete the execution, a CPU interrupts the processing prior to the CM stage and performs the exception handling. The processing is not interrupted in the WB stage to perform write-back because the execution of an instruction is fixed in this stage.

The CPU operation after receiving the wait response until the state of the bus slave becomes ready is either a non-blocking wait operation or a blocking wait operation. These two operations are described hereinafter in detail with reference to FIGS. 7 and 8.

In the non-blocking wait operation, the execution of an instruction for which a wait response is made is suspended until the wait is released, and other instructions subsequent to this instruction are executed without being suspended. FIG. 7 shows a case where the wait response is received in the DF stage of the instructions 1 and 4 out of the instructions 1 to 5, and the CPU performs the non-blocking wait operation in response thereto. For simplification of the description, the non-blocking wait operation and the blocking wait operation are also referred to hereinafter simply as non-blocking operation and blocking operation, respectively.

The charts A, B, C and D in FIG. 7 show the timing for a CPU to execute each stage of the instructions 1 to 5, the timing of signals related to an access request output from the CPU in the EX stage of the instructions 1 and 4, the timing for the CPU to retrieve data when a ready response is sent from a bus slave or an exception (exp) occurs in the DF stage of the instructions 1 and 4, and the timing of a response from a bus slave in the DF stage of the instructions 1 and 4, respectively. In these charts, the first stage (IF) in the instruction 1 is shown as the first cycle. Each timing in the charts B, C and D corresponds to each cycle shown in the chart A.

As shown in the chart A of FIG. 7, the CPU executes the EX stage of the instruction 1 in the third cycle and sends an access request to a bus slave. The access request contains a signal REQ to request processing to a the bus slave, an address ADS to be accessed, and a content CMD of the processing requested to the bus slave, which is loading for a load instruction, as shown in the chart B of FIG. 7. In the boxes of REQ in the chart B, the High-level line indicates that a REQ signal is active.

The bus slave responds to the access request in the EX stage of the instruction 1 where the REQ signal in the chart B is active. In this example, the bus slave sends a wait response (WAIT) in the fourth and fifth cycles and then sends a ready response (RDY) in the sixth cycle (cf. the chart D). The CPU suspends the execution of the instruction and then retrieves data D0 from the bus slave in the sixth cycle in response to the ready response (cf. the chart C). After that, the CPU carries out the CM stage to complete the execution and the WB stage to write-back, thereby ending the instruction 1.

The execution of the instructions 2 and 3 is started with a delay of one cycle each from the start of the execution of the instruction 1 (the first cycle). As shown in FIG. 7, while the wait response is made in the DF stage of the instruction 1 (the fourth and fifth cycles), the EX stage and the DF stage of the instruction 2 and the ID stage and the EX stage of the instruction 3 are executed. Because the CPU performs the non-blocking operation when the wait response is made in the DF stage of the instruction 1, the subsequent instructions 2 and 3 are executed.

This is the same for the instructions 4 and 5, and the IF stage and the ID stage of the instruction 4 and the IF stage of the instruction 5 are executed in the fourth and fifth cycles.

For the instruction 4, the CPU sends an access request (cf. the chart B) to a bus slave in the EX stage of the sixth cycle and receives a wait response (cf. the chart D) in DF stage of the seventh and eighth cycles. Then, an exception response (cf. EXP in the chart D) is sent from the bus slave in the ninth cycle. Although the CPU retrieves the data D1 from the bus slave at the same time as receiving the exception response, it performs the exception handling for "abnormal completion due to an exception" in the CM stage of the tenth cycle. In such a case, the WB stage of the instruction 4 is not executed as shown in the chart A, and no write-back of the data D1 which is retrieved in the ninth cycle is performed in the WB stage of the eleventh cycle.

In the DF stage of the instruction 4, because the CPU performs the non-blocking operation, the stage of the subsequent instruction 5 is executed in the seventh and eighth cycles where a wait response is made.

As described above, if the CPU performs the non-blocking operation, the subsequent instruction is executed, which contributes to higher processing performance of the entire processing system.

However, if exception handling occurs by the execution of the instruction 4 as shown in FIG. 7, the execution of the subsequent instruction 5 is completed already when the exception handling is completed in the tenth cycle. Accordingly, if the instruction 4 is executed again, the instruction 5 is executed twice. Thus, if the CPU performs the non-blocking operation, the reexecution of the instruction 4 where an exception occurs is difficult.

On the other hand, in the blocking wait operation, the execution of the instruction for which a wait response is made is suspended until the wait is released, and other instructions subsequent to that instruction are also suspended. FIG. 8 shows a case where the wait response is made in the DF stage of the instructions 1 and 4 out of the instructions 1 to 5, and the CPU performs the blocking operation in response thereto.

The charts A, B, C and D in FIG. 8 are the timing charts when the CPU executes each stage of the instructions 1 to 5, the contents of a request which is output from the CPU in the EX stage of the instructions 1 and 4, data that is retrieved by the CPU when the bus slave becomes ready or exception (exp) in the DF stage of the instructions 1 and 4, and a response from the bus slave in the DF stage of the instructions 1 and 4, respectively.

A bus slave responds to the access request in the EX stage of the instruction 1. In this example, like the example in FIG. 7, the bus slave sends a wait response in the fourth and fifth cycles and then sends a ready response (RDY in the chart D) in the sixth cycle. The CPU suspends the execution of the instruction and then retrieves data D0 from the bus slave in the sixth cycle in response to the ready response (cf. the chart C). After that, the CPU carries out the CM stage for completion and the WB stage for write-back in the seventh and eighth cycles, respectively, thereby ending the instruction 1.

The execution of the instructions 2 and 3 is started with a delay of one cycle each from the start of the execution of the instruction 1 (the first cycle). As shown in FIG. 8, while the wait response is made in the DF stage of the instruction 1 (the fourth and fifth cycles), the EX stage of the instruction 2 and the ID stage of the instruction 3 are also suspended without being executed. Because the CPU performs the blocking operation in the fourth and fifth cycles until the wait is released in the DF stage of the instruction 1, the subsequent instructions 2 and 3 are also suspended.

This is the same for the instruction 4, and the IF stage is suspended in the fourth and fifth cycles.

For the instruction 4, the CPU sends an access request (cf. the chart B) to a bus slave in the EX stage of the eighth cycle and receives a wait response (cf. the chart D) in DF stage of the ninth and tenth cycles. Then, an exception response (cf. the chart D) is sent from the bus slave in the eleventh cycle. Although the CPU retrieves the data D1 at the same time as receiving the exception response, it performs the exception handling for "abnormal completion due to an exception" in the CM stage of the twelfth cycle. In such a case, the WB stage of the instruction 4 is not executed as shown in the chart A.

In the DF stage of the instruction 4, because the CPU performs the blocking operation, the EX stage of the subsequent instruction 5 is suspended until the wait is released in the ninth and tenth cycles where a wait response is made.

As described above, if the CPU performs the blocking operation, the subsequent instruction is not executed, which results in lower processing performance of the entire processing system compared with the case where the CPU performs the non-blocking operation.

However, if exception handling occurs as in the instruction 4 of the example shown in FIG. 8, the execution of the subsequent instruction 5 is not yet completed when the exception handling is completed in the twelfth cycle. Therefore, even if the instruction 4 is reexecuted, the instruction 5 is not executed twice. Thus, if the CPU performs the blocking operation, it is possible to reexecute the instruction where an exception occurs.

As described above, there are both advantages and disadvantages when a CPU performs the blocking operation or the non-blocking operation upon receiving a wait response.

A known technique to determine whether a CPU performs the blocking operation or the non-blocking operation, which is referred to hereinafter as a first technique, is as follows.

As shown in FIG. 9, according to this technique, an address space of a bus master is divided into an address space for blocking operation (which is referred to hereinafter as a blocking operation space) and an address space for non-blocking operation (hereinafter as a non-blocking operation space). The bus master performs the blocking operation for an access to a bus slave which is connected with the blocking operation space and performs the non-blocking operation for an access to a bus slave which is connected with the non-blocking operation space. Because the bus slave illustrated in FIG. 9 is connected with the blocking operation space of the bus master, the bus master performs the blocking operation when accessing a resource, which is a register in the example of FIG. 9, of the bus slave.

Another technique, which is referred to hereinafter as a second technique, is disclosed in Japanese Unexamined Patent Application Publication No. 04-372018. According to this technique, a flag indicating whether or not to accept a wait signal is set in an instruction structure of a processor. Upon receiving a wait signal during the pipeline operation, a flag in the instruction structure corresponding to the wait signal is referred. If it is the instruction which accepts a wait signal, the next cycle is executed without waiting for the completion of the current cycle. If it is the instruction which does not accept a wait signal, the next cycle is executed after the completion of the current cycle.

We have now discovered that one bus slave does not always have one resource only. Further, not all of a plurality of resources of one bus slave always require the blocking operation. For example, if only the register D out of the four registers A to D of the bus slave shown in FIG. 9 requires the blocking operation, it is necessary to connect the bus slave to the blocking operation space of the bus master in spite that the other three registers do not require the blocking operation according to the first technique described above. As a result, the bus master carries out the blocking operation when accessing the other three registers also, which decreases the performance of the system as a whole.

We have also discovered that the second technique divides the instruction of the bus master into the blocking operation instruction and the non-blocking operation instruction in essential. The bus master refers to a flag which is set in an instruction to indicate whether the instruction is a blocking instruction or a non-blocking instruction and performs the blocking operation when executing the blocking instruction and performs the non-blocking operation when executing the non-blocking instruction.

Because this technique sets a flag indicating whether an instruction is a blocking instruction or a non-blocking instruction into the instruction structure to be executed by a bus master to thereby determine if the bus master performs the blocking operation or the non-blocking operation, it is necessary to rewrite program codes in order to switch the two operations. Thus, it costs for the operation to find a switching point to rewrite program codes and also costs for the operation to check the occurrence of degradation due to a change to the program codes. For these reasons, it is necessary to modify program codes for the switching of the blocking operation and the non-blocking operation of a bus master, which hinders the dynamic switching.

SUMMARY

In one embodiment, there is provided a bus system to execute pipeline processing. The bus system includes a bus slave, a bus master to output an access request to the bus slave, and a response unit to output a wait response to cause the bus master to perform a wait operation in response to the access request. As the wait response, the response unit outputs either one of a blocking wait response to cause the bus master to perform a blocking wait operation or a non-blocking wait response to cause the bus master to perform a non-blocking wait operation to the bus master.

In another embodiment, there is provided a bus control method. The method outputs, as a wait response in response to an access request to a resource of a bus slave from a bus master, either one of a blocking wait response to cause the bus master to perform a blocking wait operation or a non-blocking wait response to cause the bus master to perform a non-blocking wait operation in a bus system to execute pipeline processing.

In still another embodiment, there is provided a bus slave in a bus system to execute pipeline processing. The bus slave includes one or more resources and a response unit that is capable of outputting, in response to an access request to one of the resources from a bus master, a wait response that is either one of a blocking wait response to cause the bus master to perform a blocking wait operation or a non-blocking wait response to cause the bus master to perform a non-blocking wait operation.

A bus system and a bus system control method of the present invention are effective in controlling whether a bus master performs a blocking operation or a non-blocking operation.

BRIEF DESCRIPTION OF THE DRAWINGS

The above and other objects, advantages and features of the present invention will be more apparent from the following description of certain preferred embodiments taken in conjunction with the accompanying drawings, in which:

FIG. 5 is a view to describe a detail of the processing performed in the bus system shown in FIG. 1;

FIG. 7 is a view to describe a non-blocking wait operation:

FIG. 8 is a view to describe a blocking wait operation; and

DETAILED DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

An exemplary embodiment of the present invention is described hereinafter with reference to the drawings.

Figure 1:
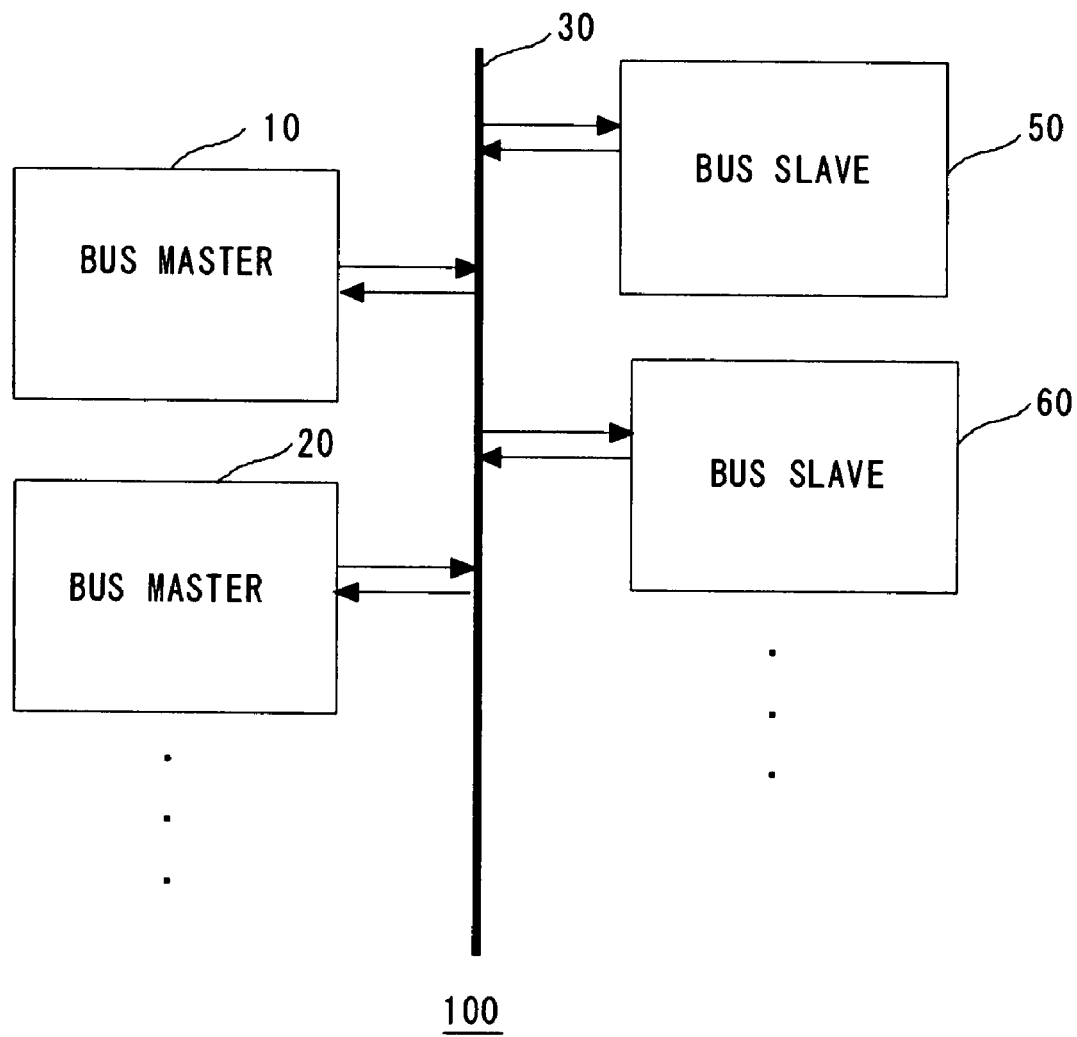
FIG. 1 is a block diagram showing the configuration of a bus system according to an embodiment of the present invention.

FIG. 1 shows a bus system 100 according to a first embodiment of the present invention. The bus system 100 includes bus masters 10, 20, . . . , a bus 30, and bus slaves 50, 60, . . . . The bus masters 10, 20, . . . and the bus slaves 50, 60, . . . are connected to be communicable with each other through the bus 30.

The bus masters 10, 20, . . . are the units which are capable of accessing a resource of a bus slave, such as CPU and DMAC. The bus slaves 50, 60, . . . are the units which are capable of receiving an access request to its resource from a bus master and sending a response thereto, such as I/O device. The DMAC may serve as both a bus master and a bus slave. Alternatively, some CPU may serve as a bus slave in the bus system where a plurality of CPUs are connected. Although FIG. 1 illustrates two bus masters, 10 and 20, and two bus slaves, 50 and 60, the number of bus masters and bus slaves may be any arbitrary number or one of above.

The bus system 100 is described hereinafter with the bus master 10 and the bus slave 50 taken as examples.

Figure 2:
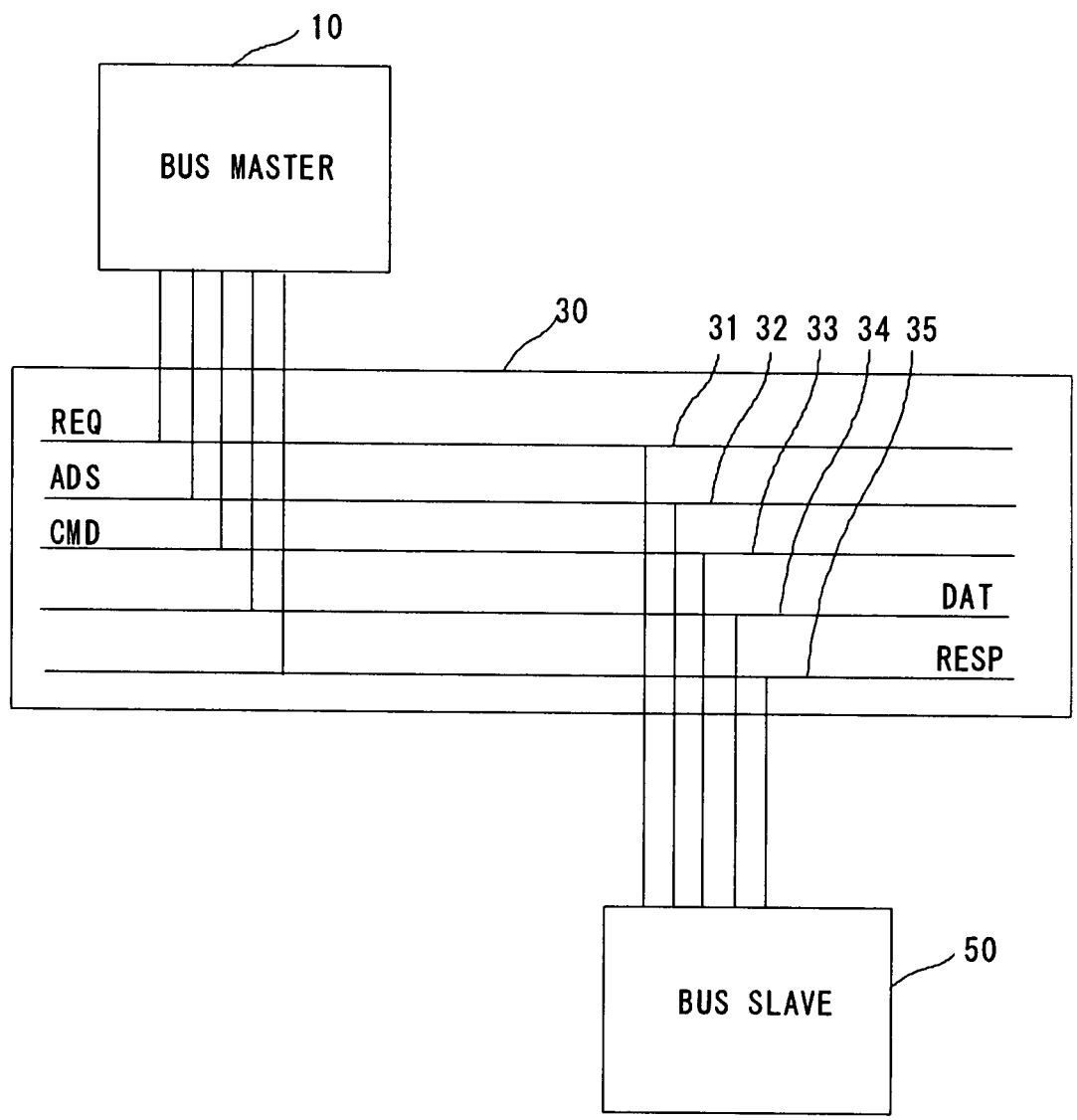
FIG. 2 is a view showing a detail of the connection between a bus master and a bus slave in the bus system shown in FIG. 1.

FIG. 2 shows a detail of the connection between the bus master 10 and the bus slave 50. The bus 30 includes a control signal line 31, an address line 32, a command line 33, a data line 34, and a response signal line 35. In the following description, the case where the bus master 10 accesses the bus slave 50 for the execution of a load instruction is described by way of illustration.

The bus master 10 sends a request signal REQ to request processing to the bus slave 50 through the control signal line 31. When sending the request signal, it also sends an address ADS and a command CMD (which is a load command in this example) indicating the contents of the processing requested to the bus slave through the address line 32 and the command line 33, respectively.

The bus slave 50 receives the request signal REQ through the control signal line 31 and obtains the address ADS and the command CMD through the address line 32 and the command line 33, respectively. The bus slave 50 decodes the obtained address ADS and determines whether it is the address of a resource of its own. If it is the address of a resource of its own, the bus slave 50 sends a response RESP through the response signal line 35.

The response RESP which is sent from the bus slave 50 is either a ready (RDY) response indicating that the bus slave 50 is ready to perform the requested processing or a wait response indicating that it is not ready. In this embodiment, the wait response from the bus slave 50 further falls into two types, which are described in detail later.

The bus slave 50 executes the requested command CMD when it is in the RDY state. Because the command CMD is a load command in this example, the bus slave 50 loads data DAT at the address which is designated by the address ADS and outputs it through the data line 34.

When the bus master 10 receives the RDY response from the bus slave 50 through the response signal line 35, it retrieves the data DAT which is output from the bus slave 50 through the data line 34.

The operation when the bus master 10 receives the wait response through the response signal line 35 is described later in conjunction with the detail of the bus slave 50.

Figure 3:
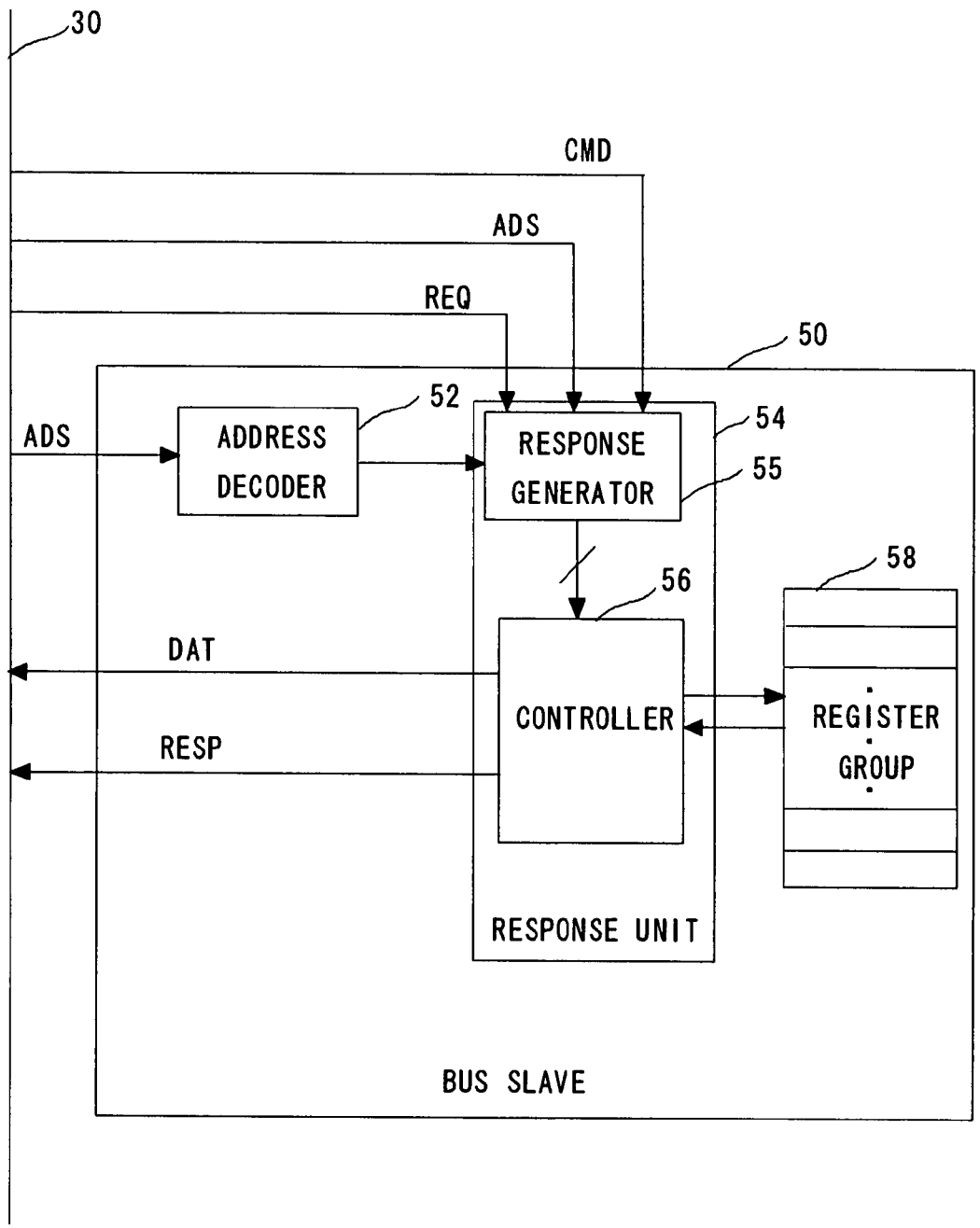
FIG. 3 is a block diagram showing the configuration of a bus slave in the bus system shown in FIG. 1.

FIG. 3 shows the configuration of the bus slave 50. The bus slave 50 includes an address decoder 52, a response unit 54, and a register group 58. The response unit 54 includes a response generator 55 and a controller 56. The signals REQ ADS and CMD in FIG. 3 are input from a corresponding signal line of the bus 30 shown in FIG. 2, which is the control signal line 31, the address line 32, and the command line 33. The signals DAT and RESP are output to the corresponding data line 34 and the response signal line 35 of the bus 30 shown in FIG. 2.

Figure 4:
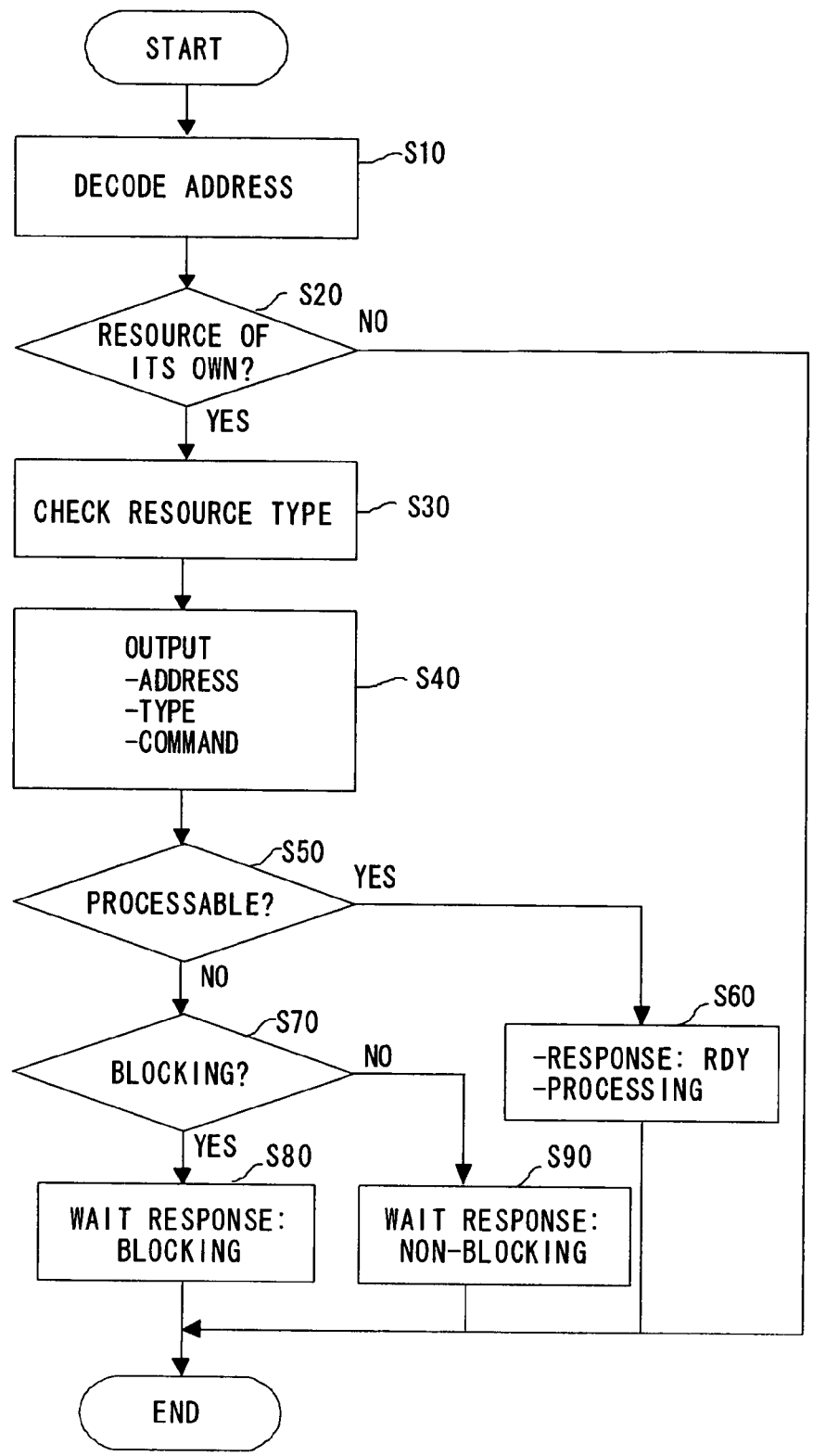
FIG. 4 is a flowchart showing the process in the bus slave 50 shown in FIG. 3.
Figure 6:
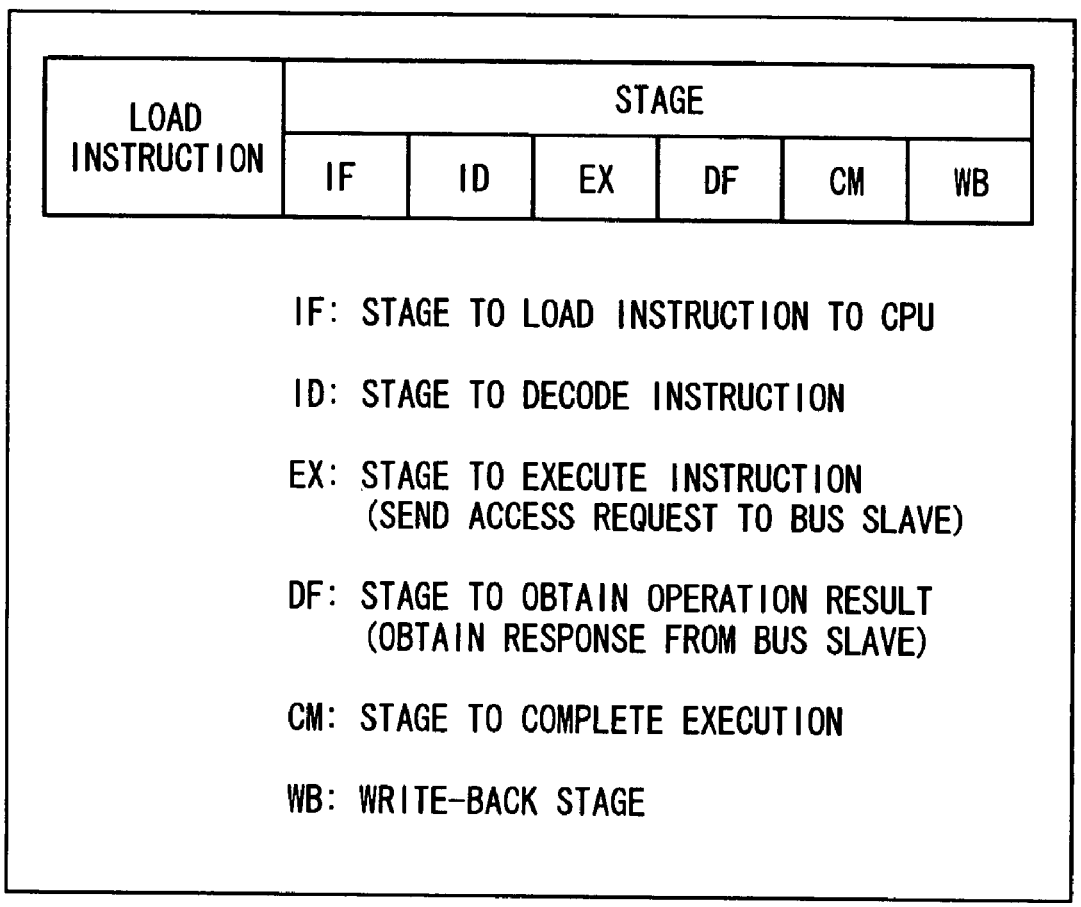
FIG. 6 is a view to describe a pipeline processing.
Figure 9:
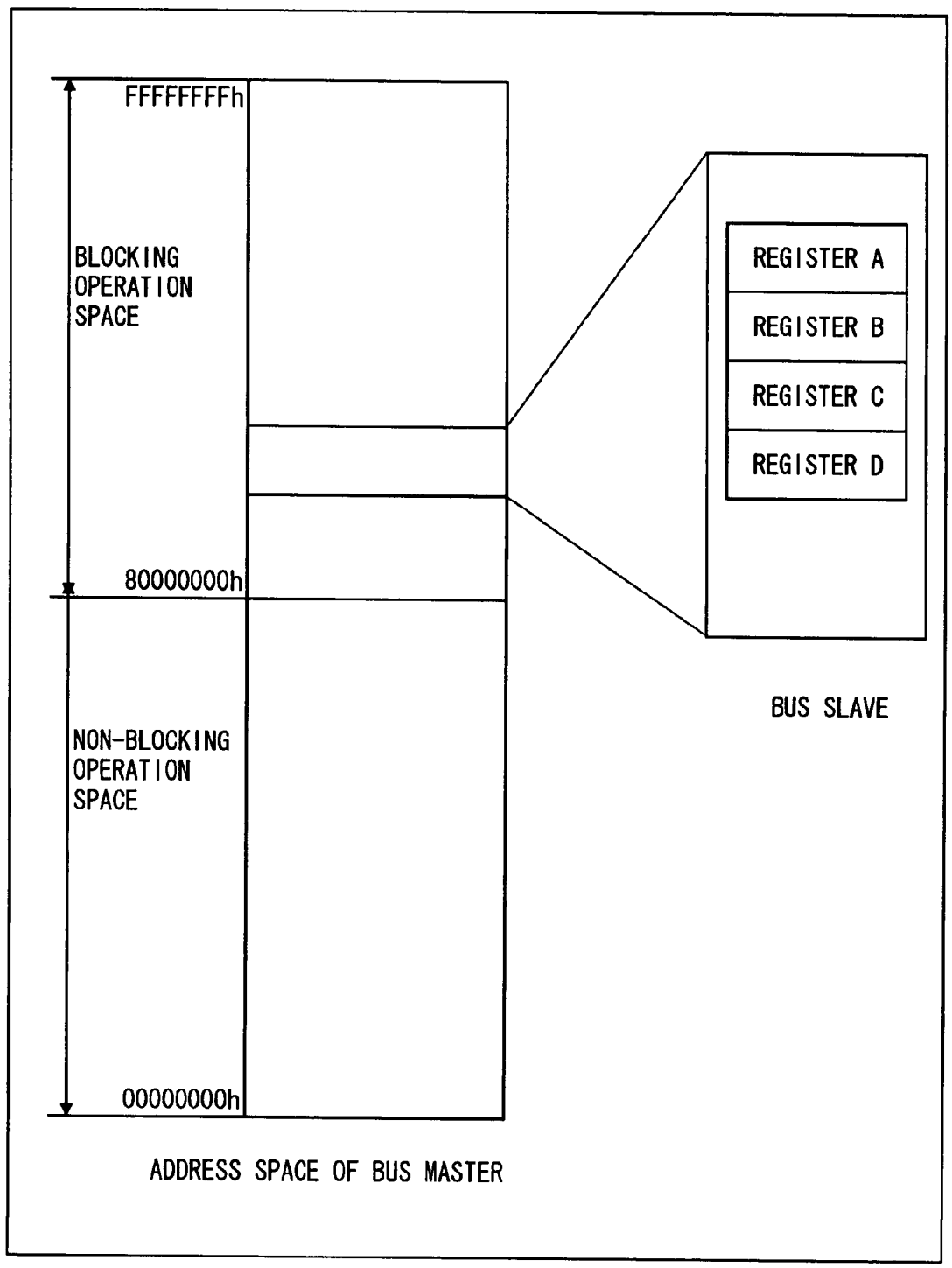
FIG. 9 is a view to describe a technique according to a related art.

FIG. 4 is a flowchart showing the operation when the bus slave 50 receives a request signal REQ from the bus master 10.

The address decoder 52 decodes the address ADS which is sent with the request signal REQ from the bus master 10, determines if the address indicates a resource of the bus slave 50 to which it belongs, and outputs the determination result to the response unit 54 (S10, S20).

In the example of FIG. 3, the bus slave 50 includes the register group 58 that includes a plurality of registers, which serve as resources of the bus slave 50.

The response generator 55 of the response unit 54 ends the process if the signal from the address decoder 52 does not indicate an access request to the resource of its own (No in S20). If, on the other hand, the signal from the address decoder 52 indicates an access request to the resource of its own, the response generator 55 receives the request signal REQ, the address ADS and the command CMD and checks the type of the register corresponding to the address ADS (Yes in S20, S30).

There are two types of registers; one is a register which requires the blocking wait operation and the other is a register which does not require the blocking wait operation.

A technique for the response generator 55 to check the type of a register may be any mechanism as long as it can determine whether a register requires the blocking wait operation or not. For example, a table which correlates a register with whether the register requires the blocking wait operation may be prepared, so that the response generator 55 can make a decision by referring to the table. Alternatively, when an address contains 16 bits, the low-order 4 bits may be used to indicate whether a register requires the blocking wait operation, so that the response generator 55 make a decision by referring to the low-order 4 bits of the address which is sent from the address decoder 52.

The response generator 55 outputs a check result in the step S30, which is information indicating the type of a register to which an access is requested, the address ADS and the command CMD to the controller 56 (Yes in S20, S30, S40).

The controller 56 determines if the requested processing is executable (S50). The determination is made by referring to a counter (not shown) indicating the number of commands which are currently processed. If the requested processing is executable (Yes in S50), the controller 56 outputs a RDY response indicating that the processing is executable through the response signal line 35 and executes the requested processing on the relevant register (S60). For example, if CMD is a load command, the controller 56 loads data from the relevant register and, upon completing the data loading, outputs a signal indicating the processing completion to the bus master 10. The controller 56 outputs the loaded data to the data line 34 and also outputs a RDY response to the response signal line 35.

The bus master 10 retrieves data from the data line 34 in response to the RDY response from the controller 56 of the bus slave 50. Upon receiving the signal indicating the processing completion, the bus master 100 performs the execution completion process and write-back to its own resource and thereby ends the instruction.

On the other hand, if the requested processing is not executable (No in S50), the controller 56 sends a blocking wait response or a non-blocking wait response to the bus master 10 according to the type of a resource sent from the response generator 55. Specifically, if the register to which an access request is made is a register that requires the blocking wait operation, the controller 56 sends a blocking wait response (Yes in S70, S80). If, on the other hand, the register to which an access request is made is a register that does not require the blocking wait operation, the controller 56 sends a non-blocking wait response (No in S70, S90).

The bus master 10 performs the blocking wait operation when it receives the blocking wait response and performs the non-blocking wait operation when it receives the non-blocking wait response.

Although it is not shown in the flowchart of FIG. 4, if an exception occurs during the execution of the requested processing, the bus slave 50 sends an exception response (exp) indicating abnormal completion to the bus master 10. When the bus master 10 receives the exception response, it does not carry out write-back to its own resource in order to perform the exception processing even though it obtains the data which is retrieved during the execution of the processing by the bus slave 50 prior to the exception response.

FIG. 5 shows a detailed example of the processing which is performed in the bus system 100 shown in FIG. 1.

The charts A, B, C and D in FIG. 5 are the timing charts when the bus master 10 executes each stage of the instructions 1 to 5, the contents of a request which is sent from the bus master 10 in the EX stage of the instructions 1 and 4, data that is retrieved by the bus master 10 when the bus slave 50 becomes ready in the DF stage of the instructions 1 and 4, and a response from the bus slave 50 in the DF stage of the instructions 1 and 4, respectively.

The bus slave 50 responds to the access request in the EX stage of the instruction 1. In this example, like the examples in FIGS. 7 and 8, the bus slave 50 sends a wait response in the fourth and fifth cycles and then sends a ready response in the sixth cycle. As an example, consider the case where the bus slave 50 sends the non-blocking (NBW) response. Receiving the NBW response, the bus master 10 suspends the execution of the instruction and then retrieves data D0 from the bus slave 50 in the sixth cycle in response to the ready response (cf. the chart C). After that, the bus master 10 executes the CM stage for completion and the WB stage for write-back in the seventh and eighth cycles respectively, thereby ending the instruction 1.

The execution of the instructions 2 and 3 is started with a delay of one cycle each from the start of the execution of the instruction 1 (the first cycle). As shown in FIG. 5, while the non-blocking wait response is made in the DF stage of the instruction 1 (the fourth and fifth cycles), the EX stage and the DF stage of the instruction 2 and the ID stage and the EX stage of the instruction 3 are executed. Because the bus master 10 performs the non-blocking operation, the subsequent instructions 2 and 3 are executed in the fourth and fifth cycles when the wait response (NBW in this case) is made in the DF stage of the instruction 1.

This is the same for the instruction 4, and the IF stage and the ID stage are executed in the fourth and fifth cycles.

For the instruction 4, the bus master 10 sends an access request (cf. the chart B) to the bus slave 50 in the EX stage of the sixth cycle and receives a wait response (cf. the chart D) in DF stage of the seventh and eighth cycles. Consider the case where the blocking wait operation (BLW) is sent as an example. As shown in FIG. 5, because the bus master 10 performs the blocking operation in the seventh and eighth cycles in response to BLW, the EX stage of the instruction 5 is suspended.

After that, the wait response to the instruction 4 is released in the ninth cycle, and the bus master 10 retrieves the data D1 from the bus slave 50. With the release of the wait response, the EX stage of the instruction 5 is also executed.

As described above, the bus system 100 of this embodiment checks if each register of the register group 58 of the bus slave 50 is a register which requires the blocking wait operation or not and, only when the register requires the blocking wait operation, it sends a wait response to make the bus slave 50 perform the blocking wait operation. It is thereby possible to minimize the blocking wait operation of the bus master 10 in the bus system 100, which enhances higher performance of the bus system 100.

Further, the bus system 100 of this embodiment causes the bus master to perform the blocking wait operation or the non-blocking wait operation by sending a blocking wait response or a non-blocking wait response. It is thereby possible to switch the operation of the bus master without rewriting the program of the bus master. This has a large advantage in program debugging.

In the process of debugging a program, a certain instruction may be reexecuted for checking in some cases. Therefore, the reexecution of an instruction is sometimes necessary even for a bus slave which does not require the blocking wait operation in actual use. To implement this, a bit indicating whether an exception of a bus slave is enabled or disabled may be used, so that the blocking wait response or the non-blocking wait response is sent as a wait response according to the value of this bit. For example, the blocking wait response is sent when a bus slave is in the state to enable an exception, and the non-blocking wait response is sent when a bus slave is in the state to disable an exception. Then, a bit value is set such that a bus slave is in the state to enable an exception during debugging of a program, thereby causing a bus master to perform the blocking wait operation. This permits the reexecution of an instruction in the event of an exception during debugging. On the other hand, a bit value is set such that a bus slave is in the state to disable an exception during actual use, thereby causing a bus master to perform the non-blocking wait operation. This achieves higher performance of the bus system during actual use.

An exemplary embodiment of the present invention is described in the foregoing. The embodiment is given by way of illustration only, and various changes and modifications may be made without departing from the scope of the present invention. All such changes and modifications as would be obvious to those skilled in the art are intended for inclusion within the scope of the present invention.

For example, although the response unit 54 is placed inside each bus slave in the bus system 100 of the above-described embodiment, the response unit 54 or part of the response unit 54 may be placed outside a bus slave, or a single response unit or part of a response unit may be placed in common among a plurality of bus slaves. When using a response unit which is common among a plurality of bus slaves, the response unit may include a table which correlates each register of each bus slave with its type (whether it requires the blocking wait operation or not), so that the response unit determines if each register of a plurality of bus slaves requires the blocking wait operation by referring to the table and then sends a blocking wait response or a non-blocking wait response according to the determination result.

Further, although the address decoder 52 is placed inside each bus slave in the bus system 100 of the above-described embodiment, the address decoder 52 may be placed outside a bus slave, or an address decoder may be placed in common among a plurality of bus slaves. When using an address decoder which is common among a plurality of bus slaves, a table which correlates an address with a bus slave to which a register corresponding to the address belongs may be placed, so that the address decoder outputs a selection signal to a bus slave to which a register corresponding to an address designated by an access request from a bus master belongs to indicate that the bus slave is designated by referring to the table.

Furthermore, although a wait response is sent in the next cycle of the request signal REQ, and the bus master 10 suspends the execution in the DF stage which is subsequent to the EX stage where the request signal REQ is issued in the example of FIG. 5 for easy implementation and high-speed processing, a system may be configured to send a wait response during the cycle where the request signal REQ is issued.

It is apparent that the present invention is not limited to the above embodiments, but may be modified and changed without departing from the scope and spirit of the invention.

What is claimed is:

1. A bus system, comprising:
a bus slave including a resource;
a bus master that executes pipeline processing and outputs an access request to the resource of the bus slave; and
a response unit that determines whether a type of the resource is a type which requires a blocking wait operation or a type which does not require a blocking wait operation, and based on the determined type of the resource outputs to the bus master as a wait response either one of a blocking wait response to cause the bus master to perform a blocking wait operation or a non-blocking wait response to cause the bus master to perform a non-blocking wait operation to cause the bus master to perform a wait operation in response to the access request, the wait operation comprising an operation in which the bus master waits for accessing to the bus slave.

2. The bus system according to claim 1, wherein the response unit comprises:
a response generator that determines whether the type of the resource comprises the type which requires the blocking wait operation or the type which requires the non-blocking wait operation; and
a controller that outputs the wait response based on a result of the determination output from the response generator.

3. The bus system according to claim 2, wherein the bus slave comprises a plurality of bus slaves, and
wherein the response unit is placed in common among the plurality of bus slaves and outputs the wait response when a bus slave of the plurality of bus slaves to which the access request is made is in a state to cause the bus master to perform the wait operation.

4. The bus system according to claim 2, further comprising:
a table which correlates each of a plurality of the resources with whether each of the plurality of resources requires the blocking wait operation or the non-blocking wait operation,
wherein the response generator determines whether the type of the resource to which the access request is made is the type which requires the blocking wait operation or the type which requires the non-blocking wait operation by referring to the table.

5. The bus system according to claim 2, wherein the access request includes determination information which indicates whether the resource needs the blocking wait operation, and
wherein the response generator determines whether the resource to which the access request is made comprises the type which requires the blocking wait operation or the type which requires the non-blocking wait operation with reference to the determination information.

6. The bus system according to claim 1, wherein the bus slave comprises a plurality of bus slaves, and
wherein the response unit is placed in common among the plurality of bus slaves and outputs the wait response when at least one of a bus slave of the plurality of bus slaves to which the access request is made is in a state to cause the bus master to perform the wait operation.

7. The bus system according to claim 1, wherein the bus slave comprises a plurality of bus slaves, and
wherein the response unit is placed for each of the plurality of bus slaves.

8. The bus system according to claim 1, wherein the bus slave comprises a plurality of bus slaves, and
wherein the response unit is placed for each of the plurality of bus slaves.

9. The bus system according to claim 8, wherein the response unit is placed inside the bus slave.

10. The bus system according to claim 8, wherein the response unit is placed outside the bus slave.

11. The bus system according to claim 1, wherein the bus slave comprises a plurality of bus slaves, and
wherein the response unit is placed in common among the plurality of bus slaves and outputs the wait response when a bus slave of the plurality of bus slaves to which the access request is made is in a state to cause the bus master to perform the wait operation.

12. The bus system according to claim 1, wherein in the blocking wait operation, an execution of a first instruction for which the wait response is made is suspended until the wait is released, and other instructions subsequent to the first instruction are not executed until the execution of the first instruction is completed, and
wherein in the non-blocking wait operation, an execution of a first instruction for which the wait response is made is suspended until the wait is released, and other instructions subsequent to the first instruction are executed.

13. The bus system according to claim 1, wherein the response unit determines whether processing requested in the access request is executable, and if the requested processing is executable, outputs a ready response to the bus master; and if the requested processing is not executable, sends a blocking wait response or a non-blocking wait response to the bus master.

14. The bus system according to claim 1, wherein the bus slave comprises a register group including a plurality of registers including a first register which needs a blocking wait operation and a second register which does not need a blocking wait operation, and the resource comprises one of the first and second registers.

15. The bus system according to claim 14, wherein the bus master is connected to the bus slave by a bus which includes a control signal line, an address line, a command line, a data line and a response signal line,
wherein the bus slave further comprises an address decoder that decodes the address, determines if the address indicates a resource of the bus slave, and outputs a determination result, and
wherein the response unit is located inside the bus slave and comprises:
a response generator that:
receives from the decoder the determination result and receives from the bus master a request signal to request the processing by the bus slave via the control signal line, the address of the resource via the address line and a command via the command line;
checks whether the resource corresponding to the address is the first register or the second register, by referring to a table which correlates each of a plurality of the resources with whether each of the plurality of the resources requires the blocking wait operation or the non-blocking wait operation; and
outputs a result of the check, the address and the command, and
a controller that:
receives the result of the check, the address and the command from the response generator;
determines whether processing requested in the request signal is executable by referring to a counter indicating a number of commands which are currently processed;
if the requested processing is executable, outputs a ready response through the response signal line and executes the requested processing on the requested resource, and outputs a signal indicating a completion of the requested processing to the bus master; and
if the requested processing is not executable, sends the blocking wait response or the non-blocking response to the bus master based on the result of the check.

16. The bus system according to claim 1, wherein an address space of the bus master is divided into an a address space for the blocking operation and an address space for the non-blocking operation,
wherein the bus slave further comprises a plurality of the resources, each of the plurality of the resources which requires the blocking operation connected with the address space for the blocking operation, each of the plurality of the resources which requires the non-blocking operation connected with the address space for the non-blocking operation; and
wherein the response unit determines whether the type of the resource to which the access request is made is the type which requires the blocking wait operation or the type which does not require the blocking wait operation, based on whether the resource to which the access request is made is connected the address space for the blocking operation or the address space for the non-blocking operation.

17. A bus slave in a bus system, comprising:
one or more resources; and
a response unit that, in response to an access request to a resource of the one or more resources from a bus master that executes pipeline processing, determines whether a type of the resource is a type which requires a blocking wait operation or a type which does not require a blocking wait operation, and based on the determined type of the resource, outputs a wait response that causes the bus master to perform a wait operation and that is either one of a blocking wait response to cause the bus master to perform a blocking wait operation or a non-blocking wait response to cause the bus master to perform a non-blocking wait operation to the bus master,
wherein the wait operation comprises an operation in which the bus master waits for accessing to the one of the resources.

18. A bus control method in a bus system, comprising:
in response to an access request to a resource of a bus slave from a bus master that executes pipeline processing, determining whether a type of the resource is a type which requires a blocking wait operation or a type which does not require a blocking wait operation; and based on the determined type of the resource, outputting to the bus master as a wait response, one of a blocking wait response to cause the bus master to perform a blocking wait operation or a non-blocking wait response to cause the bus master to perform a non-blocking wait operation, wherein a wait response causes the bus master to perform a wait operation and the wait operation comprises an operation in which the bus master waits for accessing to the resource.

19. A bus system to execute pipeline processing, comprising:

a bus slave that includes a resource;

a bus master that executes a first instruction and a second instruction subsequent to the first instruction and generates an access request to the resource in response to an execution of the first instruction requesting a result of a processing by the bus slave; and a response unit coupled to the bus slave and the bus master, wherein the response unit determines, in response to the access request, whether a type of the resource to which the access request is made is a type which requires a blocking wait operation or a type which requires a non-blocking wait operation, and based on the determined type of the resource, generates either one of a blocking wait response to cause the bus master to perform the blocking wait operation or a non-blocking wait response to cause the bus master to perform the non-blocking wait operation, wherein the bus master does not execute the second instruction until the bus master receives the result of the processing from the bus slave, when the bus slave generates the blocking wait response, and wherein the bus master starts to execute the second instruction before the bus master receives the result of the processing from the bus slave, when the bus slave generates the non-blocking wait response.

* * * * *